United States Patent

[11] 3,581,057

[72] Inventor Theodore F. Meyers
Medina, Ohio
[21] Appl. No. 864,766
[22] Filed Oct. 8, 1969
[45] Patented May 25, 1971
[73] Assignee The Hobart Manufacturing Company
Troy, Ohio

[54] HOT WATER HEATER
17 Claims, 4 Drawing Figs.

[52] U.S. Cl. .......... 219/312, 219/314
[51] Int. Cl. .......... H05b 1/00
[50] Field of Search .......... 219/310—312, 314—316; 122/5.5, 13, 40; 137/144, 209, 210, 341

[56] References Cited
UNITED STATES PATENTS

| | | | |
|---|---|---|---|
| 2,658,518 | 11/1953 | Harland et al. .......... | 137/210 |
| 2,903,551 | 9/1959 | Fischer .......... | 219/312 |
| 3,315,611 | 4/1967 | Thompson .......... | 137/209X |
| 3,381,110 | 4/1968 | Fischer .......... | 219/312 |

*Primary Examiner*—J. V. Truhe
*Assistant Examiner*—C. L. Albritton
*Attorney*—Marechal, Biebel, French and Bugg

ABSTRACT: Air is introduced and retained within a nonpressurized hot water heater tank when water is supplied to the tank and is slowly exhausted after the water supply is shut off to provide space within the tank for expansion of the water when heated. In the embodiment shown, air is aspirated into the water supply and is accumulated within an inverted cup located within the tank. When the water supply stops, air escapes from the cup thereby providing a space within the tank into which the water can expand.

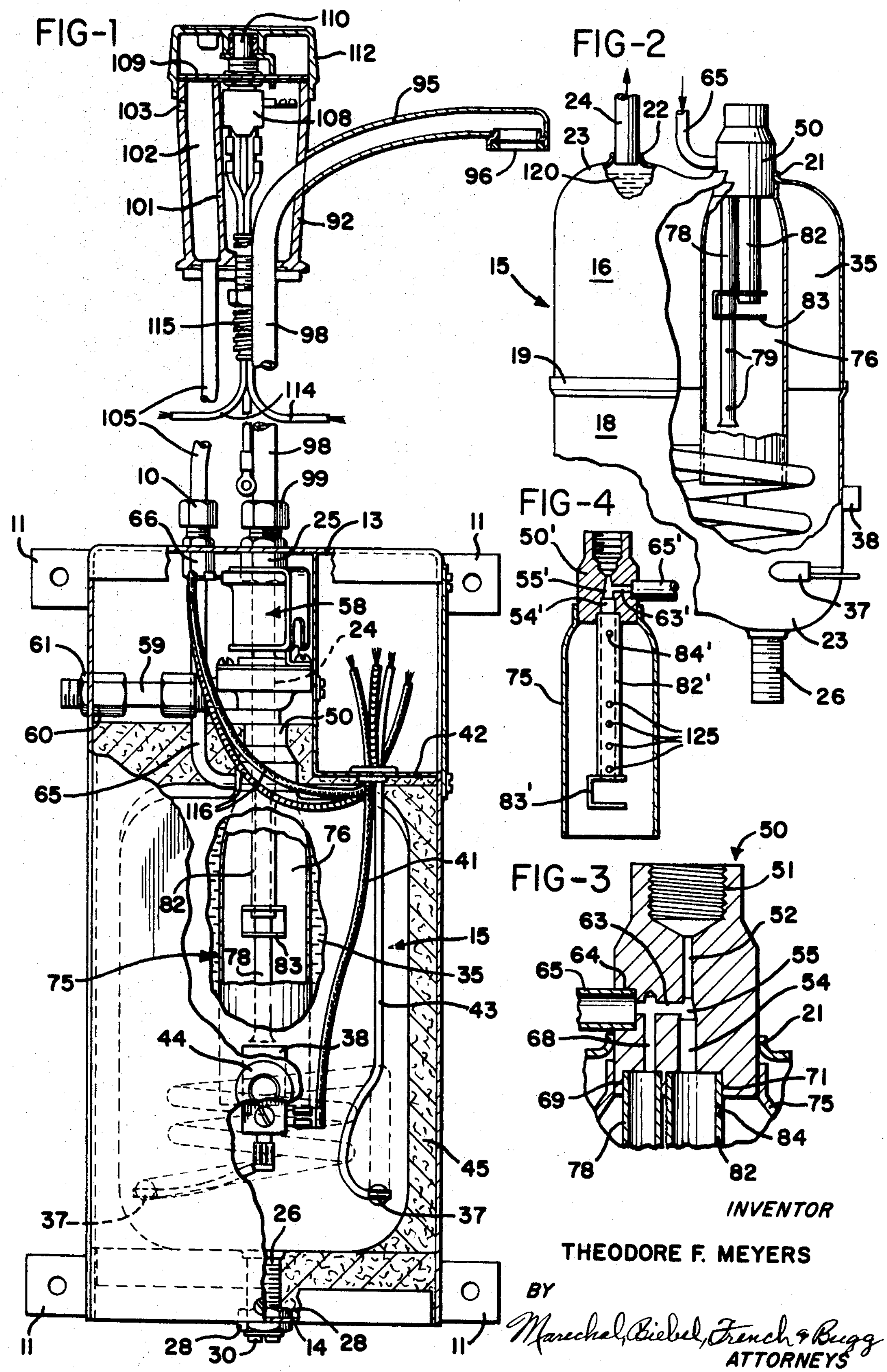
INVENTOR
THEODORE F. MEYERS
BY
Marechal, Biebel, French & Bugg
ATTORNEYS

HOT WATER HEATER

BACKGROUND OF THE INVENTION

In a hot water heater of the type disclosed in U.S. Pat. No. 2,903,551 and No. 3,381,110, hot water is heated within a small nonpressurized tank open to atmospheric pressure. As the water is heated, it expands into an auxiliary reservoir to prevent dripping of the water from the discharge spout. In the latter patent, the water within the auxiliary reservoir is aspirated into the main tank when water is supplied to the tank.

In the former patent, the water is aspirated from the auxiliary reservoir by the flow of water from the tank to the discharge spout. The relatively cooler water in the auxiliary reservoir mixes with the hot water flowing from the tank thereby reducing the temperature of the hot water dispensed. Thus the water within the storage tank must be maintained at a temperature higher than the temperature desired of the water discharged from the spout. Furthermore, in both water heaters, the auxiliary reservoir occupies substantial space and adds significantly to the overall cost of the water heater.

SUMMARY OF THE INVENTION

The present invention is directed to an improved hot water heater which employs a nonpressurized insulated tank and which is effective to bleed or introduce air into the tank when water is being supplied to the tank. The air is trapped or retained within the tank and is slowly exhausted after the water supply is shut off to produce a space within the tank into which the water expands when heated. Thus all of the heated water is stored within the insulated tank so that there is no need for an auxiliary tank and the hot water being dispensed is not diluted with cooler water. The present invention also provides for aerating the water as it is supplied to the tank so that chlorine gas is released and the water dispensed is more suited for drinking. In addition, the water heater of the invention is economical in construction and provides dependable service in that it minimizes the problem of lime depositing within small passages of the system.

In accordance with a preferred embodiment of the invention, the water heater incorporates an inverted cup within the water storage tank. A water inlet tube extends downwardly into the cup from a fitting and is connected to a water supply line through a solenoid valve. An air vent tube is connected to the water inlet tube through a venturi formed within the fitting in the water supply passageway. When water flows downwardly within the water inlet tube, air is aspirated or bleeds into the water and is introduced into the cup where the air is accumulated and retained to form an air pocket. When the water supply flow into the tank is shut off, the air slowly exhausts from the cup through the air vent tube thereby lowering the water level of the system and providing space within the tank into which the water can expand when heated.

BRIEF DESCRIPTION OF THE DRAWING

FIG. 1 is generally an elevational view of a water heater constructed in accordance with the invention and having portions broken away to show details of the construction;

FIG. 2 is generally an elevational view of the water heating tank shown in FIG. 1 and with portions broken away to show internal construction;

FIG. 3 is a section of the air and water inlet fitting shown in elevation in FIGS. 1 and 2; and FIG. 4 is a section similar to FIG. 3 and showing a modification of the invention.

DESCRIPTION OF THE PREFERRED EMBODIMENTS

The water heater shown in FIG. 1 includes a boxlike housing 10 fabricated from sheet metal and secured to upper and lower mounting brackets 11. The housing 10 includes a wrap around shell 12 having a square cross-sectional configuration and connecting a top wall 13 and a bottom wall 14. A metal tank 15 is positioned within the housing 10 and includes an upper tank section 16 (FIG. 2) connected to a lower tank section 18 by watertight seam 19.

The tank sections 16 and 18 have generally the same configuration except that the upper secton 16 has a circular inlet opening 21 and a circular outlet opening 22 located within an upwardly projecting bulge or rounded portion 23 of the tank section. An outlet or discharge tube 24 (FIG. 2) extends vertically from the outlet opening 22 to a fitting 25 (FIG. 1) secured to the top wall 13 of the housing 10. A threaded tubular drain fitting 26 extends downwardly from the corresponding rounded portion 23 of the lower tank section 18, and a pair of nuts 28 secure the drain fitting 26 to the bottom wall 14 of the housing 10. A drain pump 30 is threaded to the lower end of the fitting 26.

The tank 15 defines a water storage chamber 35, and an electric heating coil 36 is located within the lower portion of the chamber 35. The heater coil 36 has end portions 37 which extend through the lower tank section 18. A thermostat 38 is mounted on the side of the lower tank section 18 and has one terminal connected by a lead wire 39 to one end portion of the heating coil 36. A lead wire 41 extends from the other terminal to an electrical connection box 42 which also receives a lead wire 43 extending from the other end portion 37 of the heating coil 36. The thermostat 38 can be manually adjusted by rotating a knob 44 (FIG. 1) projecting outwardly from the housing 10. As also shown in FIG. 1, insulation material 45 is confined within the housing 10 and completely surrounds the tank 15.

A fitting 50 (FIG. 3) extends through the opening 21 within the upper tank section 16 and is welded to the tank section to form a watertight seal. The fitting 50 has a threaded bore 51, and a water inlet passage 52 connects the bore 51 to a larger diameter passage 54 through a tapered venturi passage 55. A solenoid actuated valve 58 has an outlet threaded to the bore 51 and an inlet connected by a tube 59 to a threaded inlet fitting 60 projecting outwardly from the housing 10 and secured thereto by a nut 61.

The fitting 50 also has a horizontal air passage 63 which extends from the venturi passage 55 to a counterbore 64 formed within the side of the fitting. An L-shaped air vent tube 65 has one end connected to the counterbore 64 and its other end connected to a fitting 66 (FIG. 1) secured to the top wall 13 of the housing 10. An air passage 68 extends vertically within the fitting 50 from the air passage 63 to a counterbore 69 located adjacent a counterbore 71 formed at the lower end of the water inlet passage 54.

An elongated inverted cup 75 has a reduced upper cylindrical end portion secured to the lower end portion of the fitting 50. The cup 75 defines an air chamber 76 having its lower end opening into the tank chamber 35 within the heating coil 36. An air vent tube 78 has its upper end portion secured within the counterbore 69 and a flared lower open end portion which is located above the lower end of the cup 75 as shown in FIG. 2. A set of axially spaced small ports 79 (FIG. 2) are formed within the lower end portion of the vent tube 78. A water inlet tube 82 has its upper end portion secured within the counterbore 71 and a lower open end located above the lower end of the air vent tube 78. A deflector 83 (FIG. 2) is secured to the vent tube 78 and provides a flat surface positioned slightly below the lower open end of the water inlet tube 82 and normal to the axis of the tube. A small port 84 (FIG. 3) is formed within the upper end portion of the water inlet tube 82 and connects the water inlet passage defined by the tube 82 with the air chamber 76 defined by the inverted cup 75.

A dispensing head 90 (FIG. 1) includes a hollow body 92 which is adapted to be secured to the horizontal flange of a sink by threaded fitting 93. A curved discharge spout 95 extends outwardly from the body 92 and has a screened outlet 96. A flexible discharge tube 98 connects the spout 95 to the fitting 25 and is releasably secured to the fitting by a nut 99. The body 92 also includes an inner partition or wall 101 which cooperates with the outer wall of the body to form a cavity 102 which is open to atmosphere through a port 103. A flexible air vent tube 105 connects the cavity 102 to the fitting 66 and is releasably secured to the fitting by a nut 106.

A normally open switch 108 is supported within the upper portion of the body 92 by a circular disc 109 and includes an actuating button 110. An inverted cuplike cap 112 covers the upper end of the body 92 and is effective to depress the button 110 and close the switch 108 when the cap 112 is rotated in either direction against the bias of a spring (not shown). Wires 114 extend from the switch 108 through a flexible conduit 115 to the connection box 42 and join wires 116 extending from the solenoid valve 58 so that the switch 108 can be connected in series with the solenoid valve 58 when the water heating unit is installed.

After the water heater is installed and the water inlet fitting 60 is connected to a suitable water supply line, the solenoid valve 58 is energized by rotating the cap 112, and the storage chamber 35 is filled with water supplied through the passages 52, 55 and 54 and the water inlet tube 82. The deflector 83 within the cup 75 deflects the stream of water discharged downwardly from the tube 82 so that the water is directed against the inner surface of the cup 75 before it flows from the lower open end of the cup chamber 76.

The flow of water through the venturi passage 55 creates a suction within the passage 63 causing air to be sucked through the port 103 and the tubes 65 and 105 and introduced into the water stream discharged from the passage 54 into the tube 82. When the water and the entrained air bubbles engage the deflector 83, the air rises and accumulates within the cup 75, and the water flows from the lower end of the cup into the chamber 35. If the water supply continues, the water level within the cup 75 drops below the uppermost port 79 within the air vent tube 78 so that a slight portion of the air flows through the upper port 79 and is recirculated through the passages 68 and 63 into the water flowing through the venturi passage 55. A continued supply of water causes the water level within the cup 75 to drop further until air flows through the lower port 79 and is recirculated. When the water level within the cup 75 drops below the lower open end of the tube 78, substantially all of the air entrained within the water is recirculated causing the water level to remain slightly below the lower end of the tube 78.

After the tank chamber 35, the tubes 24 and 98 and the discharge spout 95 are initially filled with water so that water flows from the outlet 96 and the chamber 76 is substantially filled with air, the valve 58 is closed. The water level within the cup 75 raises rather quickly from the lower end of the air tube 78 to the lower end of the fill tube 82 since the displaced air within the cup 75 can exhaust through the fill tube 82, the passages 54 and 63 and the air vent tubes 65 and 105 and through the port 103. The air entrapped within the cup chamber 76 above the lower end of the fill tube 82 is slowly exhausted from the chamber 76 through the port 84 within the upper end of the fill tube 82. As the water fills the cup 75, the water within the spout 95 drops to an approximate level 120 (FIG. 2) within the rounded portion 23 of the upper tank section 16 thereby forming an air space within the tank 15 into which the water can expand when it is heated by the heated element or coil 36.

Referring to FIG. 4 which shows a modification of the water heater of the invention, a fitting 50′ includes a water inlet venturi passage 55′ which is connected by a passage 63′ to an air vent tube 65′ in the same manner as described above for the fitting 50 shown in FIG. 3. A passage 54′ connects the venturi passage 55′ to a water inlet tube 82′ extending downwardly within the cup 75. A deflector 83′ is mounted on the lower open end of the tube 82′ to divert the downwardly directed stream of water within the tube 82′ against the inner surface of the cup 75 in the same manner as the deflector 83 shown in FIG. 2.

A port 84′ is formed within the upper end portion of the water inlet tube 82′, and a series of four axially spaced ports 125 are formed within the lower end portion of the tube 82′. When the solenoid actuated valve 58 is opened, the pressure drop across the venturi passage 55′ is effective to bleed or aspirate air through the air vent tube 65′ and into the water stream. As the air accumulates within the upper portion of the cup 75, air is aspirated inwardly through the port 84′ and into the tube 82′ by the downward flow of water within the tube and decreases the pressure drop across the venturi passage 55′ thereby decreasing the air introduced into the water inlet stream.

With further accumulation of air within the cup 75, the water level drops to the uppermost port 125, and additional air is aspirated into the water inlet stream thereby further decreasing the pressure drop across the venturi passage 55′ and the amount of air aspirated into the water inlet stream. This causes the water level within the cup 75 to drop at a progressively slower rate until it reaches the lowermost port 125 when the air aspirated through all of the ports 84′ and 125 is sufficient to decrease the pressure drop across the venturi passage 55′ to an extent that no further air is drawn into the water stream through the air vent tube 65′. When the valve 58 is deenergized or closed, the entrapped air within the cup 75 escapes at a progressively slower rate through the ports 125 and 84′ thereby lowering the water level in the system to the level 120 within the upper portion of the tank 15.

From the drawing and the above description, it is apparent that a water heater constructed in accordance with the invention provides desirable features and advantages. For example, the introduction of air into the water as it is supplied to the chamber of the cup 75, the retaining of the air within the cup chamber and the exhausting of the air after the water supply is shut off, is effective to form a space within the upper portion of the tank chamber 35 for receiving the water as it expands when heated. As a result, the heated water is confined within the tank chamber 35 and does not drip from the spout opening 96. Thus when hot water is dispensed by rotating the cap 112, all of the water flows directly from the insulated tank 15 and is not cooled by the addition of cooler water retained within an auxiliary chamber employed for expansion purposes.

Another feature is provided by the use of either the air vent tube 78 and the water fill tube 82 or the tube 82′ within the cup 75. That is, both the air vent tube 78 and the water inlet tube 82′ are effective to limit the volume of air accumulating within the cup 75. In addition, the port 84 or 84′ is effective to provide for slow exhaust of the air confined within the upper portion of the cup chamber so that an air cushion remains within the system for a short time after the inlet valve 58 is closed to provide a smooth flow of water from the spout 95 is the valve 58 is immediately reopened.

The deflector 83 or 83′ is also important in that it assures that air bubbles will not be jetted from the lower open end of the cup 75 to cause bubbling of the water from the spout opening 96. As mentioned above, the introduction of air into the water supplied to the cup 75 is also effective to release chlorine, sulfur and other objectionable gases from the water so that the hot water dispensed is more suited for making coffee, tea and the like.

While the form of apparatus herein described constitutes a preferred embodiment of the invention, it is to be understood that the invention is not limited to this precise form of apparatus, and that changes may be made therein without departing from the scope of the invention.

What I claim is:

1. In a water heater including a tank defining a storage chamber open to atmosphere, means for supplying water to said chamber and including a control valve, means for dispensing water from said chamber in response to actuation of said valve, and heating means for increasing the temperature of the water within said chamber, the improvement comprising means for supplying air to said chamber in response to supplying water to said chamber, means for accumulating and retaining air within said chamber while water is being supplied to said chamber, and means for permitting exhaustion of accumulated air from said chamber after said valve is closed to provide space within said chamber for water expansion.

2. A water heater as defined in claim 1 wherein said means for retaining air within said chamber comprise an inverted cup disposed within said chamber and having a lower end opening into said chamber.

3. A water heater as defined in claim 2 including means defining an air vent passage connected to said cup.

4. A water heater as defined in claim 1 wherein said means for supplying air into said chamber comprise a venturi passage within said water supplying means, and means defining an air vent passage connected to said venturi passage.

5. A water heater as defined in claim 1 including means for progressively reducing the volume of air supplied to said chamber in response to accumulation of air within said chamber.

6. A water heater as defined in claim 1 including means for recirculating air from said air exhausting means and said air supplying means while water is being supplied to said chamber.

7. In a water heater including a tank defining a water storage chamber, means defining an inlet within said tank for supplying water to said chamber, means defining an outlet within said tank for discharging water from said chamber, heating means for increasing the temperature of the water within said chamber, and a valve connected to said inlet for controlling the flow of water into said chamber, the improvement comprising means defining an air chamber in communication with said water storage chamber, means for introducing air into said air chamber in response to opening of said valve, means for retaining air within said air chamber while water is being supplied to said storage chamber, and means for exhausting air from said air chamber after said valve is closed.

8. A water heater as defined in claim 7 wherein said means defining said air chamber comprise an inverted cup disposed within said storage chamber and having a lower end opening into said storage chamber.

9. A water heater as defined in claim 8 including a water inlet tube extending downwardly into said cup and having an upper end connected to said inlet, said means for introducing air into said cup comprise a venturi passage connected to said tube, and means defining an air vent passage connected to said venturi passage.

10. A water heater as defined in claim 9 including means defining at least one port within said tube and to provide for said exhausting of air from said cup and through said air vent passage after said valve is closed.

11. A water heater as defined in claim 8 including a water inlet tube extending downwardly into said cup and having an upper end connected to said inlet, means for venting said tube to atmosphere, and means defining a port within the upper end portion of said tube to provide for exhausting air from said air chamber through said venting means.

12. A water heater as defined in claim 11 including a deflector disposed within said cup adjacent the lower end portion of said tube to aid in holding air within said air chamber.

13. A water heater as defined in claim 11 including means defining a plurality of axially spaced ports within the lower end portion of said tube to provide for progressively reducing the volume of air introduced into said cup while water is being supplied to said storage chamber.

14. A water heater as defined in claim 7 wherein said tank includes upper and lower mating sections, and said upper section includes an end wall formed upwardly to define an extension of said water chamber adjacent said outlet.

15. A water heater as defined in claim 7 wherein said means defining said inlet comprise a fitting projecting into said tank and having means defining a water inlet passage including a venturi portion, means defining an air passage within said fitting extending from said venturi portion, and vent means connecting said air passage to atmosphere.

16. A water heater as defined in claim 15 including a tube secured to said fitting and extending downwardly into said air chamber to form an extension of said water inlet passage into said chamber.

17. A water heater as defined in claim 7 including a solenoid actuated said valve connected to said water inlet passage, a water discharge spout connected to said outlet, and a switch disposed adjacent said spout and connected to operate said valve.